United States Patent Office 3,446,792
Patented May 27, 1969

3,446,792
9-D-PSICOFURANOSYLPURINE AND
6-SUBSTITUTED DERIVATIVES
Herman Hoeksema, Kalamazoo Township, Kalamazoo County, Mich., assignor to The Upjohn Company, Kalamazoo, Mich., a corporation of Delaware
No Drawing. Continuation-in-part of application Ser. No. 788,749, Jan. 26, 1959. This application May 23, 1960, Ser. No. 30,770
Int. Cl. C07d 51/54; A61k 21/00; A61l 13/00
U.S. Cl. 260—211.5                                27 Claims This invention relates to novel purine ketosides and to a process for their preparation and is concerned more particularly with 9-D-psicofuranosylpurine and its esters and certain novel 6-substituted derivatives thereof.

This application is a continuation-in-part of my application Ser. No. 788,749, filed Jan. 26, 1959, and now abandoned.

9-D-psicofuranosylpurine and its esters can be represented, for the most part, by the following general formula:

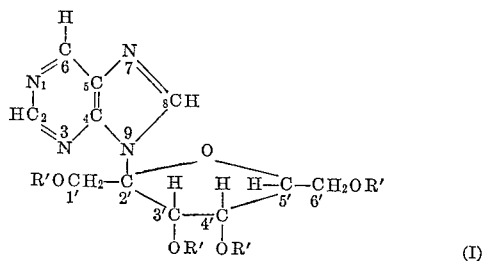

(I)

wherein R' is selected from the class consisting of hydrogen, a hydrocarbon carboxylic acid acyl radical containing from two to twelve carbon atoms, inclusive, and a halo-, hydroxy-, lower-alkoxy-, amino-, cyano-, thiocyano- and nitro-substituted hydrocarbon carboxylic acid acyl radical containing from two to twelve carbon atoms, inclusive.

The novel 6-substituted derivatives of the invention can be represented, for the most part, by the following general formulae:

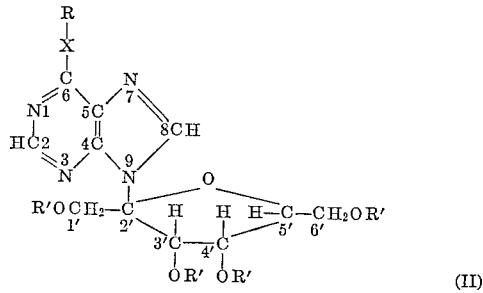

(II)

wherein R is selected from the class consisting of hydrogen, lower-alkyl, and lower-aralkyl, X is selected from the class consisting of oxygen and sulfur, and R' has the significance given above, and:

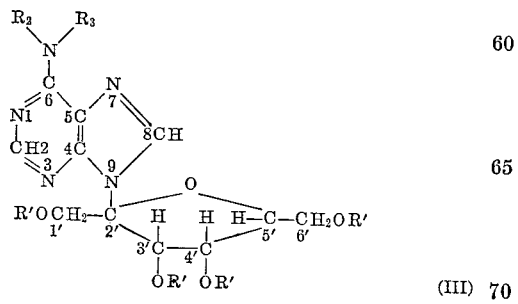

(III)

wherein R' has the significance hereinbefore defined, $R_2$ is selected from the class consisting of hydrogen, lower-alkyl, lower-aralkyl, and lower-aryl, and $R_3$ is selected from the class consisting of lower-alkyl, lower-aralkyl, and lower-aryl.

The term "lower-aryl" as used throughout the specification and claims is intended to mean an aryl radical containing from six to twelve carbon atoms, inclusive, such as phenyl, tolyl, xylyl, naphthyl, biphenyl, and the like.

The term "lower-alkyl" is intended to mean an alkyl radical containing from one to eight carbon atoms, inclusive, such as methyl, ethyl, propyl, butyl, amyl, hexyl, heptyl, octyl, and isomeric forms thereof.

The term "lower-aralkyl" is intended to mean an aralkyl radical containing from seven to thirteen carbon atoms, inclusive, such as benzyl, phenethyl, benzhydryl, naphthylmethyl, and the like.

The term "hydrocarbon carboxylic acid acyl radical containing from two to twelve carbon atoms, inclusive," is intended to mean an acyl radical corresponding to a hydrocarbon carboxylic acid containing from two to twelve carbon atoms, inclusive. Suitable such acids include (a) a saturated or unsaturated, straight or branched chain aliphatic carboxylic acid such as acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated cycloaliphatic carboxylic acid such as cyclobutanecarboxylic, cyclopentanecarboxylic, cyclopentenecarboxylic, dimethylcyclohexenecarboxylic, dipropylcyclohexanecarboxylic acids, and the like; (c) a saturated or unsaturated cycloaliphatic-substituted aliphatic carboxylic acid such as cyclopentaneacetic, cyclopentanepropionic, cyclopenteneacetic, cyclohexanebutyric, methylcyclohexaneacetic acids, and the like; (d) an aromatic carboxylic acid such as benzoic, toluic, naphthoic, ethylbenzoic, isobutylbenzoic, methylbutylbenzoic acids, and the like; and (e) an aromatic-aliphatic carboxylic acid such as phenylacetic, phenylpropionic, phenylvaleric, cinnamic, phenylpropiolic, α-naphthylacetic acids, and the like.

The term "halo-, hydroxy-, lower-alkoxy-, amino,- cyano-, thiocyano- and nitro-substituted hydrocarbon carboxylic acid acyl radical containing from two to twelve carbon atoms, inclusive" is intended to mean a hydrocarbon carboxylic acid acyl radical as hereinbefore defined which is substituted by one or more halogen atoms, hydoxy, lower-alkoxy, amino, cyano, thiocyano, or nitro groups. By "lower-alkoxy" is meant an alkoxy group containing from one to eight carbon atoms, inclusive, such as methoxy, ethoxy, propoxy, butoxy, amyloxy, hexyloxy, heptyloxy, octyloxy, and isomeric forms thereof. Examples of substituted hydrocarbon carboxylic acid acyl radicals falling within the above definition are the acyl radicals corresponding to chloroacetic, chloropropionic, bromobutyric, iodovaleric, chlorocyclohexanecarboxylic, chlorobenzoic, anisic, salicylic, nitrobenzoic, cyanoacetic, thiocyanoacetic, and lactic acids, glycine, and the like.

It is an object of the invention to provide the novel compounds having the Formulae I, II, and III above. Other objects of the invention will be apparent to one skilled in the art.

The novel compounds of the invention having the Formulae I, II, and III above exhibit activity as bactericides. Illustratively, 6-hydroxy-9-D-psicofuranosylpurine and 6-dimethylamino-9-D-psicofuranosylpurine exhibit activity against S. haemolyticus in mice. The compounds of the invention are useful to control infections of bacterial origin in laboratory animals such as rats, mice, guinea pigs, dogs, monkeys, and the like as well as in other animals such as fish, birds, poultry, and mammals of economic and aesthetic value. In addition, the compounds of the invention are useful to effect selective control of organisms in mixed populations as in differential plate assays and in the selective inhibition of bacteria in the propagation of other industrial microorganisms such as yeasts and fungi.

Further, the novel compounds of the invention are useful as intermediates for making the corresponding nucleotides, i.e., the corresponding monophosphates and polyphosphates. The novel compounds of the invention, as well as the nucleotides derived therefrom, are also of value in studying metabolic processes in cells.

The starting compound used in making the compounds of the invention is 6-amino-9-D-psicofuranosylpurine (IV) which is obtained as an elaboration product of the organism Streptomyces hygroscopicus var. as described in copending application Ser. No. 720,066, filed Mar. 10, 1958, now U.S. Patent No. 3,020,274

The novel compound, 6-hydroxy-9-D-psicofuranosylpurine, having the Formula II above in which X represents an oxygen atom, and R and R' represents hydrogen atoms, can be prepared by treating the compound (IV) with nitrous acid and allowing the diazo compound, formed as intermediate, to decompose without isolation. The reaction can be accomplished in a convenient manner, by treating the compound (IV), in solution or suspension in dilute aqueous acid, such as aqueous acetic acid, with an inorganic nitrite such as sodium nitrite, barium nitrite, and the like, at a temperature of about 0° C. to about 30° C., and allowing the reaction mixture to stand for a period of several hours at a temperature of about 20° C. to about 30° C. The required compound can be isolated from the reaction mixture by conventional procedures, for example, by neutralization with base followed by absorption on activated charcoal and elution of the activated charcoal with a suitable solvent such as acetone from which the desired compound is isolated by evaporation.

The novel compounds of the invention having the Formula I, or the Formula II in which X represents an oxygen atom and R represents hydrogen, and R' represents an acyl group as hereinbefore defined can be prepared from the corresponding compounds in which R' represents a hydrogen atom (obtained as described above) by acylation using procedures well-known in the art. For example, the compound having Formula I or Formula II above in which X is an oxygen atom and R and R' represent hydrogen atoms, can be reacted with the appropriate acid halide or acid anhydride in the presence of a tertiary amine such as pyridine, quinoline, isoquinoline, a trialkylamine, for example, triethylamine, tripropylamine, and the like, an N,N-dialkylaniline such as dimethylaniline, diethylaniline, and the like, or an N-alkylpiperidine such as N-methylpiperidine, N-ethylpiperidine, and the like. The desired compound can be isolated from the reaction mixture by conventional procedures, for example, by decomposing the reaction mixture with ice-water, extracting the desired product in a suitable solvent, for example, chloroform, benzene, and the like, and isolating the desired product therefrom by evaporation.

When the amount of acid halide or anhydride employed in the above acylation is at least four moles per mole of the compound to be acylated, and is preferably greatly in excess of four moles per mole, there will be obtained the corresponding tetra-acylate, i.e., the compound having the Formula I, or the Formula II in which X is an oxygen atom and R is hydrogen, and each of the groups R' is an acyl group corresponding to a hydrocarbon or substituted-hydrocarbon carboxylic acid as hereinbefore defined. Where the amount of acid halide or anhydride employed in the acylation is less than four moles per mole of the compound to be acylated, there will be produced a mixture of partially acylated compounds, i.e., compounds having the Formula I, or II in which X is an oxygen atom and R is hydrogen, and one or more of the groups R' is an acyl group. In particular, when the acid halide or anhydride and the compound to be acylated are employed in equimolar proportions, there will be obtained a mixture of the mono-acyl derivatives. Such mixtures can be separated into their component parts by conventional methods, for example, by countercurrent distribution using a suitable solvent system.

The compounds of the invention having the Formula II above in which X represents a sulfur atom, R is hydrogen and each of the groups R' represents an acyl radical as hereinbefore defined, can be prepared from the corresponding compounds having the Formula II in which X represents an oxygen atom, by procedures known in the art for the conversion of hydroxyl groups to thiol groups. For example, the hydroxy compounds defined above can be reacted with phosphorus pentasulfide in the presence of a tertiary amine as hereinbefore defined. The desired compounds can be isolated from the reaction mixture in a convenient manner by decomposing the latter with ice-water, extracting the desired compound in a suitable solvent and isolating therefrom by evaporation. The compounds can then be deacylated by procedures known in the art, for example, by treatment with ammonia in solution in a lower alkanol such as methanol, ethanol, and the like, to yield the corresponding compounds of Formula II in which R and R' are hydrogen atoms and X is a sulfur atom.

The compounds of the invention having the Formula II above in which X represents a sulfur atom, R represents a lower-alkyl or lower aralkyl radical, and R' is as hereinbefore defined can be prepared by alkylation or aralkylation of the corresponding free-mercapto compounds (obtained as described above). This can be accomplished in a convenient manner by treating the latter compounds with the appropriate alkyl or aralkyl halide in the presence of a dilute aqueous solution of an alkali metal hydroxide such as sodium hydroxide, potassium hydroxide, and the like. The desired compound separates from the reaction mixture as a solid and is readily isolated therefrom by filtration. The compound so obtained can be purified, if desired, for example, by recrystallization. Where the starting material of Formula II above contains one or more acyl groups in the psicose moiety (i.e., one or more of the groups R' represents acyl) said compound will be deacylated during the course of the above alkylation or aralkylation. The compound so obtained can be re-acylated, if desired, in a subsequent step using the procedures hereinbefore described to obtain a compound having the Formula II above in which X represents a sulfur atom, R represents a lower-alkyl or lower-aralkyl radical, and one or more of the groups R' represents an acyl radical.

The compounds of the invention having the Formula II above in which X represents a sulfur atom, R represents a lower-alkyl or lower-aralkyl group, and R' is as hereinbefore defined can be reacted with an amine having the formula

wherein $R_2$ and $R_3$ are selected from the group consisting of lower-alkyl, lower-aralkyl, and lower aryl, and $R_2$ can also represent a hydrogen atom, to yield the corresponding compounds having the Formula III (R'=H).

The reaction of the 6-substituted-mercapto compounds having the Formula II above with the amine

can be carried out using the conditions described by Albert and Brown, J. Chem. Soc. 1954, 2060–71 for the reaction of 6-methylmercaptopurine with dimethylamine to give 6-dimethylaminopurine. It is to be noted that, where any of the hydroxyl groups in the psicose moiety of the starting compounds of Formula II are acylated (i.e., one or more of the groups R' is acyl), said acyl groups will be removed under the conditions of the reaction. The resulting 6-substituted-amino-9-D-psicofuranosylpurine can be reacylated, if desired, using the procedure hereinbefore discribed. It is to be noted that, by using ammonia in place of the amine

in the above-described reaction, it is possible to convert the 6-substituted-mercapto compounds to the original starting material, 6-amino-9-D-psicofuranosylpurine (IV).

Suitable amines which can be sued in the above reaction include alkylamines such as methylamine, ethylamine, isoproyplamine, sec-butylamine, dimethylamine, diethylamine methylpropylamine, and the like, alkyl-aralkylamines such as N-methyl-N-benzylamine, N-isopropyl-N-phenylethylamine, N-methyl-N-naphtylmethylamine, and the like, aralkylamines, such as benzylamine, dibenzylamine, benzhydrylamine, α and β-phenylethylamines, α-naphthylmethylamine, and the like, alkylarylamines such as N-methylaniline, N-methyl-o-toluidine, N-methyl-p-toluidine, N-ethyl-m-toluidine, and the like, and arylamines such as aniline, o-, m-, and p-toluidines, diphenylamine, α-naphthylamine, o-, m-, and p-biphenylylamines, and the like.

The compounds of the invention having the Formula II in which X is a sulfur atom, R is a hydrogen atom and one or more of the groups R' represents an acyl radical corresponding to a hydrocarbon or substituted-hydrocarbon carboxylic acid as hereinbefore defined, can be prepared by acylating the corresponding compound in which each of the groups R' represents hydrogen using the procedure hereinbefore described for the acylation of the compounds of Formula II in which X is an oxygen atom and R and R' are hydrogen atoms.

The compounds of the invention having the Formulas I and II in which R and X are as hereinbefore defined and the groups R' in the 3'- and/or 4'-positions in the psicose moiety represent acyl radicals corresponding to hydrocarbon or substituted-hydrocarbon carboxylic acids as hereinbefore defined, the remainder of the groups R' being hydrogen atoms, can also be prepared using the following procedure. A compound having the Formulas I or II in which R and X are as hereinbefore defined and each of the groups R' represents a hydrogen atom is treated with at least 2 molar proportions (at least 3 molar proportions when R is hydrogen and X is sulfur) of trityl chloride or trityl bromide in the presence of a tertiary amine as hereinbefore defined, to yield the corresponding 1', 6'-ditrityl ether (in the case of compounds of Formula II where R is hydrogen and X is sulfur there will be produced the 1', 6'-ditrityl ether of the corresponding 6-trityl-mercapto compound). The trityl ether so obtained is then acylated with the appropriate acid anhydride or halide under the conditions hereinbefore described. By employing equimolar proportions of the acylating agent and the trityl ether there will be produced a mixture of the corresponding 3'-monoacylate and 4'-monoacylate, which mixture can be separated into its component parts by conventional procedures, for example, by countercurrent distribution in a suitable solvent system. By employing at least two molar proportions of acylating agent per mole of the trityl ether there will be produced the corresponding 3', 4'-diacylate. Further by acylating the 3'-monoacylate or 4' monoacylate prepared as described above, using an acylating agent other than the one used to prepare the monoacylate there can be produced the 3',4'-diacylates in which the two acyl groups are different.

The 3'-monoacylate, 4'-monoacylate and 3',4'-diacylate trityl ethers so obtained can then be treated, for example, by hydrogenolysis in the presence of a catalyst such as palladium-on-charcoal, to remove the trityl groups and yield the desired compounds having the Formula I or II above in which R and X are as hereinbefore defined and one or both of the groups R' in the 3'- and 4'-positions in the psicose moiety represent acyl radicals corresponding to hydrocarbon or substituted-hydrocarbon carboxylic acids as hereinbefore defined, the remainder of the groups R' being hydrogen atoms. The compounds so obtained can themselves be acylated further under the conditions hereinbefore defined, using acylating agents other than those used to acylate the hydroxyl groups in the 3'- and 4'-positions, thereby producing acylated compounds of the invention in which the acyl groups in the 3'- and/or 4'-positions differ from those in the other positions in the molecule.

The compounds of the invention having the Formula I or II above wherein R and X are as hereinbefore defined and R' represents an acyl radical as hereinbefore defined can also be prepared by reacting a halomercuri derivative of purine or a halomercuri derivative of a purine having the formula:

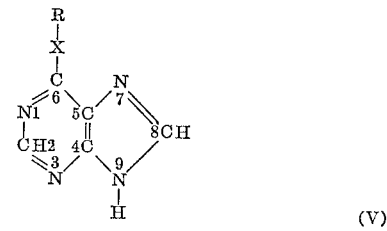

(V)

wherein R and X have the significance hereinbefore defined, with a D-psicofuranosyl halide tetra-acylate, wherein the acyl radical is that corresponding to a hydrocarbon carboxylic acid or a substituted-hydrocarbon carboxylic acid as hereinbefore defined, in the presence of an inert solvent. The reaction is conducted in a convenient manner by heating the reactants in the presence of the inert solvent at a temperature within the range of about 50° C. to about 150° C. The reaction time can vary according to the reaction temperature employed but is generally of the order of about one to about three hours. The inert solvents which can be employed are those solvents which are inert, i.e., do not enter into reaction with either of the principal reactants, under the conditions of the reaction. Such solvents include benzene, toluene, xylene, decalin, carbon tetrachloride, and the like. Where the group R, in the purine having the Formula V above employed as starting material, represents a hydrogen atom, it is preferable, though not essential, to convert said compound to the corresponding lower-aralkyl ether and employ the ether so obtained in the process described above. The lower-aralkyl group can be removed subsequently, for example, by hydrogenolysis in the presence of a catalyst such as palladium-on-charcoal, to reform the free hydroxy or free mercapto group.

The compounds obtained in the above reaction can be converted to the corresponding compounds having the Formula I or II above in which R' represents a hydrogen atom by de-acylation using the procedure hereinbefore described.

The purines having the Formula V which are employed in the above reaction as starting materials are well-known in the art or can be prepared by known procedures. The 6-alkoxypurines (V, R=alkyl, X=O) and 6-aralkoxypurines (V, R=aralkyl, X=O) can be obtained by reacting 6-chloropurine [Bendich et al., J. Am. Chem. Soc.

76, 6073 (1954)] with an alkali metal derivative, for example, the sodium derivative, of the appropriate alkanol or aralkanol. The 6-alkoxypurines and 6-aralkoxypurines can also be obtained by acylation and cyclization of the corresponding 6-alkoxy- and 6-aralkoxy-4,5-diaminopyrimidines according to the method described by Traube, Berichte 33, 3035 (1900). The 6-alkylmercaptopurines (V, R=alkyl, X=S) and the 6-aralkylmercaptopurines (V, R=aralkyl, X=S) can be prepared by alkylating or aralkylating 6-mercaptopurine (U.S. Patent 2,724,711), using the procedure described by Albert and Brown (supra) for the conversion of 2-mercaptopurine to 2-methylmercaptopurine.

The D-psicofuranosyl halide tetra-acylates employed as starting materials in the above reaction can be obtained by procedures well-known in the art. Thus, using the procedure described by Fischer, Berichte 44, 1899 (1911) for the preparation of tetraacetylglucosyl bromide, D-psicose is converted to its penta-acyl derivative by reaction with the appropriate acid anhydride or acid halide and the penta-acyl derivative is reacted with the appropriate hydrogen halide at a temperature of approximately 0° C. to yield the required D-psicofuranosyl halide tetra-acylate.

The halomercuri derivatives of purine or the purines of Formula V, employed as starting materials in the above reaction, can be prepared by reacting a mercuric halide with purine or a purine of Formula V using the procedure described by Davoll and Lowy, J. Am. Chem. Soc. 73, 1650 (1951) for the preparation of the chloromercuri derivatives of 6-acetamidopurine and 6-benzamidopurine.

The compounds of the invention having the Formula I above can be prepared from the corresponding compounds having the Formula II above, in which X represents a sulfur atom and R represents a lower-alkyl or lower aralkyl group, by catalytic desulfurization of the latter compounds, for example, by treatment with a Raney nickel catalyst in the presence of a neutral, non-halogenated solvent, preferably water, methanol, ethanol, propanol, and the like. The reaction is preferably conducted at reflux temperature. The desired product can be isolated from the reaction mixture in a convenient manner by removing the catalyst by filtration and evaporating the filtrate to dryness. While it is possible to use as starting materials in the above reaction the compounds of Formula II above in which X represents a sulfur atom, R represents lower alkyl or lower-aralkyl, and at least one of the groups R' represents an acyl radical as hereinbefore defined, it is preferable to employ compounds in which all the groups R' represent hydrogen atoms. If the startting compound II contains one or more acyl groups in the psicose moiety (i.e., one or more of the groups R' represents acyl) said compound will be deacylated, at least partially, under the conditions of the desulfurization and the required product will be difficult to separate from the resulting mixture.

It will be appreciated therefore that the compounds having the Formula I above can be obtained from 6-amino-9-D-psicofuranosylpurine (IV) using the following reaction sequence. The compound 6-amino-9-D-psicofuranosylpurine is treated with nitrous acid as hereinbefore described to obtain 6-hydroxy-9-D-psicofuranosylpurine (II, R=H, X=O, R'=H). The latter compound can then be converted to the corresponding tetra-acrylate (II, R=H, X=O, R'=acyl as defined above) using the procedures hereinbefore defined and the tetra-acylate is treated with phosphorus pentasulfide in the presence of a tertiary amine, using the procedures hereinbefore described, to obtain the corresponding 6-mercapto-9-D-psicofuranosylpurine tetra-acylate (II, R=H, X=S, R'=acyl). The latter compound can be deacylated, if desired, using the procedures hereinbefore described, but is preferably reacted, without deacylation, with an alkyl or aralkyl halide by the procedure described previously to obtain the corresponding 6-alkylmercapto- or 6-aralkylmercapto-9-D-psicofuranosylpurine (II, R=alkyl or aralkyl, X=S, R'=H). Deacylation occurs under the conditions of the alkylation. The substituted mercapto compound so obtained is then subjected to catalytic desulfurization as hereinbefore described, to obtain the desired compound (I).

The novel compounds of the invention, when used in therapy, can be combined with solid or liquid pharmaceutical carriers and formulated as tablets, powder packs, or capsules, or dissolved or suspended in suitable solvents, for oral or parenteral administration.

The following examples are illustrative of the process and products of the present invention, but are not to be construed as limiting.

EXAMPLE 1

6-hydroxy-9-D-psicofuranosylpurine

To a mixture of 20 g. (0.072 mole) of 6-amino-9-D-psicofuranosylpurine and 84 g. (0.366 mole) of barium nitrite in 2000 ml. of water, maintained at 25° C., was added 40 ml. of glacial acetic acid. The mixture was maintained at 25° C. for a further 24 hours before being treated with 52 g. (0.366 mole) of anhydrous sodium sulfate. The resulting mixture was filtered and the filtrate was adjusted to a pH of 7.0 by the careful addition of 2 N potassium hydroxide solution. The neutralized filtrate was stirred for 2 hours with 100 g. of activated charcoal (Darco G–60) and the charcoal was then isolated by filtration. The charcoal was extracted by boiling with 90% aqueous acetone for ten minutes. The resulting suspension was filtered and the filtrate was evaporated under reduced pressure to a volume of approximately 125 ml. The solution so obtained was freeze-dried and the residue so obtained was recrystallized from water. There was thus obtained 6-hydroxy-9-D-psicofuranosylpurine in the form of a white solid having a melting point of 162° C. The ultraviolet absorption spectrum of the compound in solution in 0.01 N hydrochloric acid exhibited a maximum at 250 millimicrons ($a=40.6$); the ultarviolet absorption spectrum of the compound in solution in 0.01 N sodium hydroxide exhibited a maximum at 255 millimicrons ($a=45.8$).

EXAMPLE 2

6-hydroxy-9-D-psicofuranosylpurine tetraacetate

To a mixture of 5 g. (0.0277 mole) of 6-amino-9-D-psicofuranosylpurine and 21 g. (0.0915 mole) of barium nitrite in 500 ml. of water, cooled in ice, was added 10 ml. of acetic acid. The mixture was allowed to stand at room temperature (approximately 20° C.) overnight and was then treated with 13 g. of sodium sulfate. The solid which separated was isolated by filtration. The filtrate was adjusted to pH 7.0 by the addition of aqueous sodium hydroxide solution and the resulting solution was freeze-dried. The residue was dried by adding 10 ml. of butanol and distilling the solvent in vacuo. The dry residue was dissolved in 200 ml. of anhydrous pyridine. The solution was cooled in ice and treated with 60 ml. of acetic anhydride. The mixture was cooled in ice for a further 2.5 hours before being filtered. The filtrate was maintained at 0° C. for 3 days after which 12 g. of cracked ice was added and the solution was stirred at 5° C. for three hours. The resulting solution was evaporated to dryness in vacuo and the residue was suspended in water and extracted with chloroform. The chloroform extract was washed with water, then with 0.03 N sulfuric acid, and dried over anhydrous calcium sulfate. The dried solution was filtered and the filtrate evaporated to dryness. The residue (1.75 g.) was subjected to 1000 transfers in a Craig countercurrent distribution apparatus using the solvent system of n-butanol:water:cyclohexane in the ratio by volume of 40:50:10, respectively. The tubes containing the peak at $K=0.82$ were pooled and evaporated to dryness. There was thus obtained 6-hydroxy-9-D-psicofuranosylpurine tetraacetate in the form of a crystalline solid having a melting point of 216° to 217° C. The ultraviolet spectrum of the compound (dissolved in 0.01 N sulfuric acid) exhibited a maximum at 249 millimicrons ($a=20.9$). The ultraviolet spectrum of the compound (dissolved in 0.01 N potassium hydroxide) exhibited a maximum at 255 millimicrons ($a=22.3$).

*Analysis.*—Calcd. for $C_{19}H_{22}N_4O_{10}$: C, 48.93; H, 4.76; N, 12.01; O, 34.30. Found: C, 48.66; H, 4.81; N, 12.24; O, 34.31.

In a similar manner, but replacing acetic anhydride by benzoyl chloride, propionyl chloride, isobutyryl chloride, valeryl chloride, isovaleryl chloride, tert.-butylacetyl chloride, caproyl chloride, heptanoyl chloride, phenylacetyl chloride, toluoyl chloride, cyclopentylpropionyl chloride, cyclopentenylpropionyl chloride, cyclohexylacetyl chloride, acrylyl chloride, crotonyl chloride, hex-2-yn-1-oyl chloride, oct-2-yn-1-oyl chloride, chloroacetyl bromide, p-chlorobenzoyl chloride, anisoyl chloride, salicyloyl bromide, p-nitrobenzoyl chloride, and cyanoacetyl chloride, there are obtained 6-hydroxy-9-D-psicofuranosylpurine tetrabenzoate, tetrapropionate, tetraisobutyrate, tetravalerate, tetraisovalerate, tetra-tert.-butylacetate, tetracaproate, tetraheptanoate, tetrahphenylacetate, tetratoluate, tetracyclopentylpropionate, tetracyclopentenylpropionate, tetracyclohexylacetate, tetraacrylate, tetracrotonate, tetra-hex-2-yn-1-oate, tetraoct-2-yn-1-oate, tetrachloroacetate, tetra-p-chlorobenzoate, tetraanisate, tetrasalicylate, tetra-p-nitrobenzoate, and tetracyanoacetate, respectively.

EXAMPLE 3

6-mercapto-9-D-psicofuranosylpurine tetraacetate

To a mixture of 9 g. (0.019 mole) of 6-hydroxy-9-D-psicofuranosylpurine tetraacetate (prepared as described in Example 2), 14.3 g. (0.064 mole) of phosphorus pentasulfide, and 250 ml. of anhydrous pyridine was added 2.5 ml. of water and the mixture was heated under reflux for 4 hours. The resulting mixture was cooled and the supernatant liquid was decanted from the solid residue. The latter was extracted with 200 ml. of boiling water. The extract was combined with the decanted liquid and the mixture was evaporated to an aqueous phase in vacuo. The aqueous residue was cooled and the solid which separated was isolated by filtration and triturated with alcohol and ether until colorless. There was thus obtained 5.4 g. of 6-mercapto-9-D-psicofuranocylpurine tetraacetate in the form of a colorless solid.

In a similar manner, using 6-hydroxy-9-D-psicofuranosylpurine tetrabenzoate in place of 6-hydroxy-9-D-psicofuranosylpurine tetraacetate, there was obtained 6-mercapto-9-D-psicofuranosylpurine tetrabenzoate.

EXAMPLE 4

6-mercapto-9-D-psicofuranosylpurine

A solution of 3 g. of 6-mercapto-9-D-psicofuranosylpurine tetraacetate (obtained as described in Example 3) in 250 ml. of methanol, previously saturated with ammonia at 0° C., was maintained for 16 hours at 4° C. and then evaporated to dryness in vacuo. The residue was dissolved in 16 ml. of water and the solution was seeded to induce crystallization. The crystals which separated were isolated by filtration, washed with water, and dried. There was thus obtained 6-mercapto-9-D-psicofuranosylpurine in the form of a crystalline solid having a melting point of 155–158° C.

The ultraviolet absorption spectrum of this compound (in solution in 0.01 N sulfuric acid) exhibited a maximum at 322 millimicrons. The ultraviolet absorption spectrum of this compound (in solution in 0.01 N potassium hydroxide) exhibited a maximum at 312 millimicrons.

EXAMPLE 5

6-methylmercapto-9-D-psicofuranosylpurine

To a solution containing 3.15 g. (0.01 mole) of 6-mercapto-9-D-psicofuranosylpurine, 8 ml. of N sodium hydroxide, and 100 ml. of water was added 1.4 g. (0.01 mole) of methyl iodide. The mixture was shaken for 2 hours at approximately 25° C., at the end of which time a further 2 g. of methyl iodide and 1.5 ml. of N sodium hydroxide was added and the shaking was continued for a further hour. The mixture was then filtered and the filtrate was evaporated partially. The concentrated filtrate was allowed to stand at approximately 25° C. and the solid which separated was isolated by filtration and recrystallized from water. There was thus obtained 2.2 g. of 6-methylmercapto-9-D-psicofuranosylpurine in the form of a white crystalline solid having a melting point of 98 to 102° C. The ultraviolet spectrum of the compound (in solution in 0.01 N sulfuric acid) exhibited maxima at 225, 288, and 293 millimicrons. The ultraviolet spectrum of the compound (in solution in 0.01 N sodium hydroxide) exhibited maxima at 288 and 293 millimicrons.

*Analysis.*—Calcd. for $C_{12}H_{16}N_4O_5S$: C, 43.89; H, 4.91; N, 17.07; S, 9.76. Found: C, 43.46; H, 5.02; N, 17.17; S, 9.59.

In a similar manner, but replacing methyl iodide by isobutyl iodide, amyl iodide, octyl iodide, benzyl chloride, and benzhydryl chloride, there are obtained 6-isobutylmercapto-, 6-amylmercapto-, 6-octylmercapto-, 6-benzylmercapto-, and 6-benzhydrylmercapto-9-D-psicofuranosylpurine, respectively.

EXAMPLE 6

6-methylmercapto-9-D-psicofuranosylpurinetetraacetate

A mixture of 3.28 g. (0.01 mole) of 6-methylmercapto-9-D-psicofuranosylpurine and 100 ml. of anhydrous pyridine was cooled and treated with 50 ml. (0.537 mole) of acetic anhydride. The mixture so obtained was allowed to stand for 5 days at ambient laboratory temperature (approximately 20° C.) and was then treated with 20 g. of ice and stirred with cooling for 3 hours. The resulting mixture was evaporated to dryness under reduced pressure and the residue was dissolved in chloroform. The chloroform solution was washed with water, then with 0.03 N sulfuric acid and again with water, before being evaporated to dryness. There was thus obtained 6-methylmercapto-9-D-psicofuranosylpurine tetraacetate.

In a similar manner, but using benzoyl chloride in place of acetic anhydride, there was prepared 6-methylmercapto-9-D-psicofuranosylpurine tetrabenzoate.

EXAMPLE 7

9-D-psicofuranosylpurine

A mixture of 1 g. of 6-methylmercapto-9-D-psicofuranosylpurine, 1 g. of Raney nickel catalyst, and 25 ml. of water was heated under reflux for 2 hours. The hot mixture was filtered and the insoluble material was washed on the filter with 25 ml. of boiling water. The combined filtrate and washings was evaporated to dryness in vacuo, and the solid residue was recrystallized from water. There was thus obtained 9-D-psicofuranosylpurine in the form of a crystalline solid monohydrate having a melting point of 96 to 100° C.

*Analysis.*—Calcd. for $C_{11}H_{14}N_4O_5 \cdot H_2O$: C, 44.00; H, 5.37; N, 18.16. Found: C, 43.64; H, 5.38; N, 18.30.

EXAMPLE 8

9-D-psicofuranosylpurine tetraacetate

Using the procedure described in Example 6, but substituting 9-D-psicofuranosylpurine for 6-methylmercapto-9-D-psicofuranosylpurine, there was obtained 9-D-psicofuranosylpurine tetraacetate.

EXAMPLE 9

6-dimethylamino-9-D-psicofuranosylpurine

A solution of 1.1 g. (0.0033 mole) of 6-methylmercapto-9-D-psicofuranosylpurine in 10 ml. of methanol containing 1 g. (0.022 mole) of dimethylamine was heated at 150° C. for 1 hour in a sealed tube. The resulting mixture was evaporated to dryness in a stream of nitrogen and the residue was subjected to countercurrent distribution using 200 transfers in the system n-butanol:water. The material in tubes 80 to 110 ($K=0.88$) was isolated by evaporation of the solvent in vacuo and the residue was recrystallized from water. There was thus obtained 6-dimethylamino-9-D-psicofuranosylpurine in the form of a crystalline solid monohydrate having a melting point of 159 to 161° C. The ultraviolet spectrum of the compound (in solution in 0.01 N sulfuric acid) exhibited a maximum at 270 millimicrons. The ultraviolet spectrum of the compound (in solution in 0.01 N sodium hydroxide) exhibited a maximum at 278 millimicrons.

*Analysis.*—Calcd. for $C_{13}H_{19}N_5O_5 \cdot H_2O$: C, 45.47; H, 6.17; N, 20.40. Found: C, 46.02; H, 5.85; N, 20.72.

EXAMPLE 10

6-diethylamino-9-D-psicofuranosylpurine

Using the procedure described in Example 9, but substituting diethylamine for dimethylamine, there was obtained 6-diethylamino-9-D-psicofuranosylpurine.

EXAMPLE 11

6-isopropylamino-9-D-psicofuranosylpurine

Using the procedure described in Example 9, but substituting isopropylamine for dimethylamine, there was obtained 6-isopropylamino-9-D-psicofuranosylpurine.

EXAMPLE 12

6-diisobutylamino-9-D-psicofuranosylpurine

Using the procedure described in Example 9, but substituting diisobutylamine for dimethylamine, there was obtained 6-diisobutylamino-9-D-psicofuranosylpurine.

EXAMPLE 13

6-benzylamino-9-D-psicofuranosylpurine

Using the procedure described in Example 9, but substituting benzylamine for dimethylamine, there was obtained 6-benzylamino-9-D-psicofuranosylpurine.

EXAMPLE 14

6-anilino-9-D-psicofuranosylpurine

Using the procedure described in Example 9, but substituting aniline for dimethylamine, there was obtained 6-anilino-9-D-psicofuranosylpurine.

EXAMPLE 15

6-mercapto-9-D-psicofuranosylpurine tetraacetate

To a solution of 14.3 g. (0.03 mole) of 6-hydroxy-9-D-psicofuranosylpurine tetraacetate (prepared as described in Example 2) in 250 ml. of anhydrous pyridine was added 21 g. (0.094 mole) of phosphorus pentasulfide. The mixture was allowed to stand for 2 hr. at approximately 25° C. before being heated under reflux for 16 hr. The resulting mixture was cooled and treated with 10 ml. of water. The solution so obtained was allowed to stand for 2 hr. at approximately 25° C. before being evaporated to dryness in vacuo. The residue was dissolved in 175 ml. of chloroform and an equal volume of water. The chloroform layer was washed successively with three 175 ml. portions of water, 100 ml. of cold 0.02 N sulfuric acid, two 175 ml. portions of water and one 100 ml. portion of water. The washed extract was dried over anhydrous sodium sulfate and the dried solution was filtered. The filtrate was evaporated in a stream of nitrogen to a volume of about 75 ml. and to the concentrate was added 250 ml. of Skellysolve B (a mixture of hexanes). The solid which separated was isolated by filtration and recrystallized from a mixture of methyl ethyl ketone, absolute ethanol and ether. There was thus obtained 6-mercapto-9-D-psicofuranosylpurine tetraacetate in the form of a crystalline solid having a melting point of 227 to 230° C. The ultraviolet absorption spectrum of the compound (in solution in 0.01 N potassium hydroxide) exhibited maxima at 243 and 312 millimicrons. The ultraviolet absorption spectrum of the compound (in solution in 0.01 N sulfuric acid) exhibited maxima at 227 and 322 millimicrons.

*Analysis.*—Calcd. for $C_{19}H_{22}N_4O_9S$: C, 47.30; H, 4.60; N, 11.61; O, 29.85; S, 6.65. Found: C, 47.53; H, 4.64; N, 12.01; O, 29.65; S, 6.57.

I claim:

1. An N-psicofuranoside having the formula:

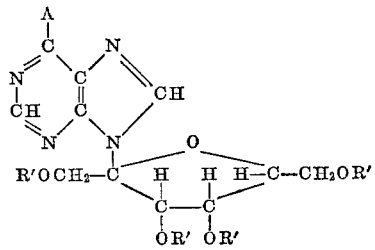

wherein A is selected from the class consisting of hydrogen, the group —XR wherein R is selected from the class consisting of hydrogen, lower-alkyl, and lower-aralkyl, and X is selected from the class consisting of oxygen and sulfur, and the group

wherein $R_2$ is selected from the class consisting of hydrogen, lower-alkyl, lower-aralkyl, and lower-aryl, and $R_3$ is selected from the class consisting of lower-alkyl, lower-aralkyl, and lower-aryl, and R' is selected from the class consisting of hydrogen, a hydrocarbon carboxylic acid acyl radical containing from two to twelve carbon atoms, inclusive, and a halo-, hydroxy-, lower-alkoxy-, amino-, cyano-, thiocyano-, and nitro-substituted hydrocarbon carboxylic acid acyl radical containing from two to twelve carbon atoms, inclusive.

2. 6-hydroxy-9-D-psicofuranosylpurine.
3. 6-hydroxy-9-D-psicofuranosylpurine tetraacetate.
4. 6-hydroxy-9-D-psicofuranosylpurine tetrabenzoate.
5. 6-mercapto-9-D-psicofuranosylpurine.
6. 6-mercapto-9-D-psicofuranosylpurine tetraacetate.
7. 6-mercapto-9-D-psicofuranosylpurine tetrabenzoate.
8. 6-methylmercapto-9-D-psicofuranosylpurine.
9. 9-D-psicofuranosylpurine.
10. 6-dimethylamino-9-D-psicofuranosylpurine.
11. A process for the preparation of 9-D-psicofuranosylpurine which comprises the steps of treating 6-amino-9-D-psicofuranosylpurine with nitrous acid to obtain 6-hydroxy-9-D-psicofuranosylpurine, treating the latter compound, in the presence of a tertiary amine, with an acylating agent selected from the class consisting of an acid anhydride and an acid halide corresponding to a hydrocarbon carboxylic acid containing from two to twelve carbon atoms, inclusive, and a halo-, hydroxy-, lower-alkoxy-, amino-, cyano-, thiocyano-, and nitro-substituted hydrocarbon carboxylic acid containing from two to twelve carbon atoms, inclusive, to obtain a 6-hydroxy-9-D-psicofuranosylfurine tetra-acylate, reacting the tetra-acylate so obtained with phosphorus pentasulfide in the presence of a tertiary amine to produce the corresponding 6-mercapto-9-D-psicofuranosylpurine tetra-acylate, reacting the latter compound with a halide selected from the class consisting of lower-alkyl halides and lower-aralkyl halides in the alkaline medium to obtain the corresponding 6 - substituted-mercapto-9-D-psicofuranosylpurine, and subjecting the latter compound to catalytic desulfurization using Raney nickel to obtain the desired 9-D-psicofuranosylpurine.

12. A process for the preparation of 6-hydroxy-9-D-psicofuranosylpurine which comprises reacting 6-amino-9-D-psicofuranosylpurine with nitrous acid at a temperature within the range of about 0° C. to about 30° C.

13. A process for the preparation of a 6-mercapto-9-D-psicofuranosylpurine tetra-acylate wherein the acyl group is selected from the class consisting of hydrocarbon carboxylic acid acyl groups containing from two to twelve carbon atoms, inclusive, and halo-, hydroxy-, lower-alkoxy-, amino-, cyano-, thiocyano-, and nitro-substituted hydrocarbon carboxylic acid acyl groups containing from two to twelve carbon atoms, inclusive, which comprises treating the corresponding 6-hydroxy-9-D-psicofuranosylpurine tetra-acylate with phosphorus pentasulfide in the presence of a tertiary amine.

14. A process for the preparation of an N-psicofuranoside having the formula:

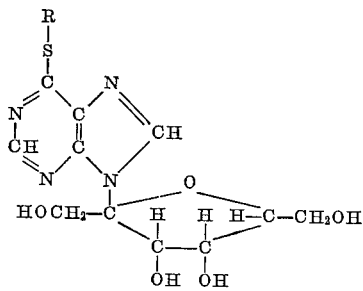

wherein R is selected from the class consisting of lower-alkyl and lower-aralkyl which comprises reacting a compound selected from the class consisting of 6-mercapto-9-D-psicofuranosylpurine and a 6-mercapto-9-D-psicofuranosylpurine tetra-acylate wherein the acyl radical is selected from the class consisting of hydrocarbon carboxylic acid acyl groups containing from two to twelve carbon atoms, inclusive, and halo-, hydroxy-, lower-alkoxy-, amino-, cyano-, thiocyano-, and nitro-substituted hydrocarbon carboxylic acid acyl groups containing from two to twelve carbon atoms, inclusive, with a halide R-Hal wherein R is as hereinbefore defined and Hal represents a halogen atom, in the presence of an alkaline medium.

15. A process for the preparation of an N-psicofuranoside having the formula:

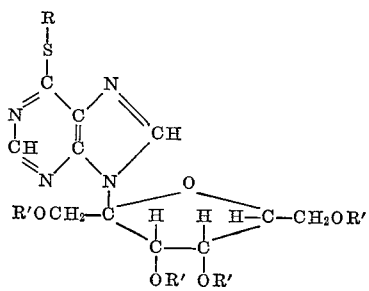

wherein R is selected from the class consisting of lower-alkyl and lower-aralkyl and R' is selected from the class consisting of hydrocarbon carboxylic acid acyl groups containing from two to twelve carbon atoms, inclusive, and halo-, hydroxy-, lower-alkoxy-, amino-, cyano-, thiocyano-, and nitro-substituted hydrocarbon carboxylic acid acyl groups containing from two to twelve carbon atoms, inclusive, which comprises reacting an N-psicofuranoside having the formula:

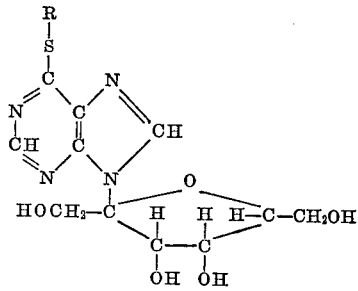

wherein R is as hereinbefore defined with at least four molar proportions of an acylating agent selected from the class consisting of R'$_2$O and R'Hal, wherein R' is as hereinbefore defined and Hal represents a halogen atom, in the presence of a tertiary amine.

16. A process for the desulfurization of an N-psicofuranoside having the formula:

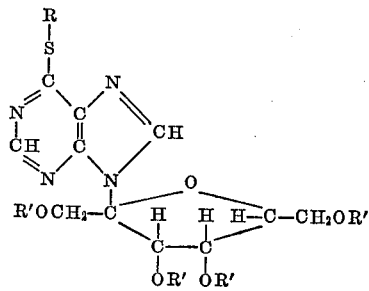

wherein R is selected from the class consisting of lower-alkyl and lower-aralkyl and R' is selected from the class consisting of hydrogen, a hydrocarbon carboxylic acid acyl group containing from two to twelve carbon atoms, inclusive, and a halo-, hydroxy-, lower-alkoxy-, amino-, cyano-, thiocyano-, and nitro-substituted hydrocarbon carboxylic acid acyl group containing from two to twelve carbon atoms, inclusive, which comprises heating said compound with Raney nickel catalyst in the presence of an inert solvent.

17. A process for the preparation of an N-psicofuranoside having the formula:

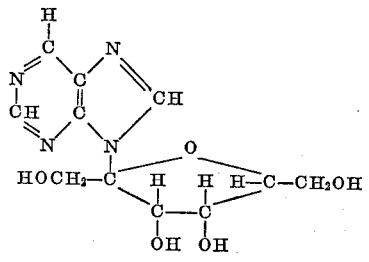

which comprises catalytically desulfurizing with Raney nickel an N-psicofuranoside having the formula:

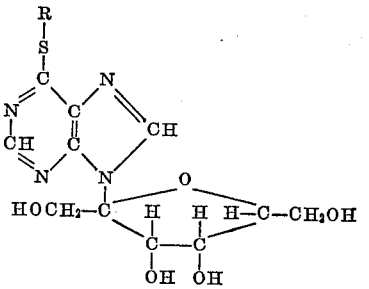

wherein R is selected from the class consisting of lower-alkyl and lower-aralkyl.

18. A process for the preparation of an N-psicofuranoside having the formula:

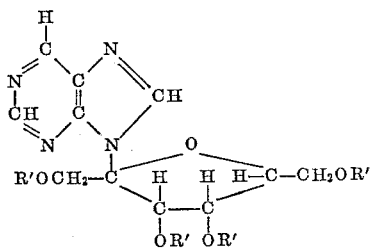

wherein R' is selected from the class consisting of hydrocarbon carboxylic acid acyl groups containing from two to twelve carbon atoms, inclusive, and halo-, hydroxy-, lower-alkoxy-, amino-, cyano-, thiocyano-, and nitro-substituted hydrocarbon carboxylic acid acyl groups containing from two to twelve carbon atoms, inclusive, which comprises reacting 9-D-psicofuranosylpurine with at least four molar proportions of an acylating agent selected from the class consisting of R'₂O and R'Hal, wherein R' is as hereinbefore defined and Hal represents a halogen atom, in the presence of a tertiary amine.

19. A process for the preparation of a 6-mercapto-9-D-psicofuranosylpurine tetra-acylate wherein the acyl group is selected from the class consisting of hydrocarbon carboxylic acid acyl groups containing from two to twelve carbon atoms, inclusive, and halo-, hydroxy-, lower-alkoxy-, amino-, cyano-, thiocyano-, and nitro-substituted hydrocarbon carboxylic acid acyl groups containing from two to twelve carbon atoms, inclusive, which comprises the steps of treating 6-amino-9-D-psicofuranosylpurine with nitrous acid to obtain 6-hydroxy-9-D-psicofuranosylpurine, treating the latter compound, in the presence of a tertiary amine, with an acylating agent selected from the class consisting of R'₂O and R'Hal wherein R' is an acyl group as hereinbefore defined and Hal represents a halogen atom, to obtain a 6-hydroxy-9-D-psicofuranosylpurine tetra-acylate and reacting the tetra-acylate so obtained with phosphorus pentasulfide in the presence of a tertiary amine.

20. A process for the preparation of 6-mercapto-9-D-psicofuranosylpurine which comprises the steps of treating 6-amino-9-D-psicofuranosylpurine with nitrous acid to obtain 6-hydroxy-9-D-psicofuranosylpurine, treating the latter compound, in the presence of a tertiary amine, with an acylating agent selected from the class consisting of an acid anhydride and an acid halide corresponding to a hydrocarbon carboxylic acid containing from two to twelve carbon atoms, inclusive, and a halo-, hydroxy-, lower-alkoxy-, amino-, cyano-, thiocyano-, and nitro-substituted hydrocarbon carboxylic acid containing from two to twelve carbon atoms, inclusive, to obtain a 6-hydroxy-9-D-psicofuranosylpurine tetra-acylate, reacting the tetra-acylate so obtained with phosphorus pentasulfide in the presence of a tertiary amine to produce the corresponding 6-mercapto-9-D-psicofuranosylpurine tetra-acylate and subjecting the tetra-acylate so obtained to deacylation.

21. A process for the preparation of 6-mercapto-9-D-psicofuranosylpurine, which comprises deacylating a 6-mercapto-9-D-psicofuranosylpurine tetra-acylate wherein the acyl radical is selected from the class consisting of hydrocarbon carboxylic acid acyl radicals containing from two to twelve carbon atoms, inclusive, and halo-, hydroxy-, lower-alkoxy-, amino-, cyano-, thiocyano-, and nitro-substituted hydrocarbon carboxylic acid acyl radicals containing from two to twelve carbon atoms, inclusive.

22. A process for the preparation of a 6-mercapto-9-D-psicofuranosylpurine tetra-acylate wherein the acyl group is selected from the class consisting of hydrocarbon carboxylic acid acyl groups containing from two to twelve carbon atoms, inclusive, and halo-, hydroxy-, lower-alkoxy-, amino-, cyano-, thiocyano-, and nitro-substituted hydrocarbon carboxylic acid acyl groups containing from two to twelve carbon atoms, inclusive, which comprises the steps of treating 6-hydroxy-9-D-psicofuranosylpurine with an acylating agent selected from the class consisting of R'₂O and R'Hal wherein R' is an acyl group as hereinbefore defined and Hal represents a halogen atom, in the presence of a tertiary amine, and reacting the 6-hydroxy-9-D-psicofuranosylpurine tetra-acylate so obtained with phosphorus pentasulfide in the presence of a tertiary amine.

23. A process for the preparation of an N-psicofuranoside having the formula:

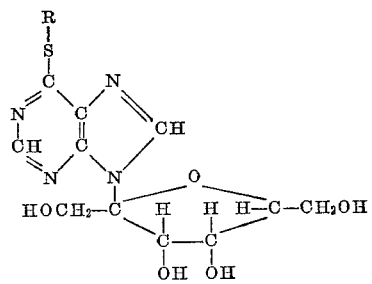

wherein R is selected from the class consisting of lower-alkyl and lower-aralkyl, which comprises the steps of treating 6-amino-9-D-psicofuranosylpurine with nitrous acid to obtain 6-hydroxy-9-D-psicofuranosylpurine, treating the latter compound, in the presence of a tertiary amine, with an acylating agent selected from the class consisting of an acid anhydride and an acid halide corresponding to a hydrocarbon carboxylic acid containing from two to twelve carbon atoms, inclusive, and a halo-, hydroxy-, lower-alkoxy-, amino-, cyano-, thiocyano-, and nitro-substituted hydrocarbon carboxylic acid containing from two to twelve carbon atoms, inclusive, to obtain a 6-hydroxy-9-D-psicofuranosylpurine tetra-acylate, reacting the tetra-acylate so obtained with phosphorus pentasulfide in the presence of a tertiary amine to produce the corresponding 6-mercapto-9-D-psicofuranosylpurine tetra-acylate, and reacting the latter compound with a halide selected from the class consisting of lower-alkyl halides and lower-aralkyl halides in an alkaline medium whereby alkylation and deacylation occur simultaneously.

24. A process for the preparation of an N-psicofuranoside having the formula:

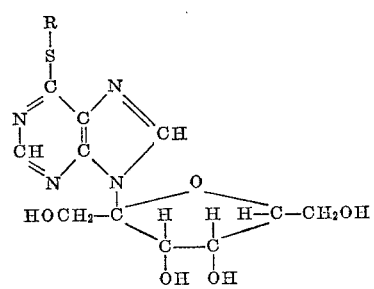

wherein R is selected from the class consisting of lower-alkyl and lower-aralkyl, which comprises the steps of treating 6-hydroxy-9-D-psicofuranosylpurine, in the presence of a tertiary amine, with an acylating agent selected from the class consisting of an acid anhydride and an acid halide corresponding to a hydrocarbon carboxylic acid containing from two to twelve carbon atoms, inclusive, and a halo-, hydroxy-, lower-alkoxy-, amino-, cyano-, thiocyano-, and nitro-substituted hydrocarbon carboxylic acid containing from two to twelve carbon atoms, inclusive, to obtain a 6-hydroxy-9-D-psicofuranosylpurine tetra-acylate, reacting the tetra-acylate so obtained with phosphorus pentasulfide in the presence of a tertiary amine to produce the corresponding 6-mercapto-9-D-psicofuranosylpurine tetra-acylate, reacting the latter compound with a halide selected from the class consisting of lower-alkyl halides and lower-aralkyl halides in an alkaline medium whereby alkylation and deacylation occur simultaneously.

25. A process for the preparation of an N-psicofuranoside having the formula:

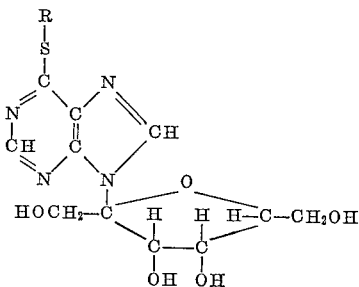

wherein R is selected from the class consisting of lower-alkyl and lower-aralkyl, which comprises the steps of reacting a 6-hydroxy-9-D-psicofuranosylpurine tetra-acylate, wherein the acyl group is selected from the class consisting of a hydrocarbon carboxylic acid acyl group containing from two to twelve carbon atoms, inclusive, and a halo-, lower-alkoxy-, hydroxy-, amino-, cyano-, thiocyano-, and nitro-substituted hydrocarbon carboxylic acid acyl group containing from two to twelve carbon atoms, inclusive, with phosphorus pentasulfide in the presence of a tertiary amine to produce the corresponding 6-mercapto-9-D-psicofuranosylpurine tetra-acylate, and reacting the latter compound with a halide selected from the class consisting of lower-alkyl halides and lower-aralkyl halides in an alkaline medium whereby alkylation and deacylation occur simultaneously.

26. A process for the preparation of an N-psicofuranoside having the formula:

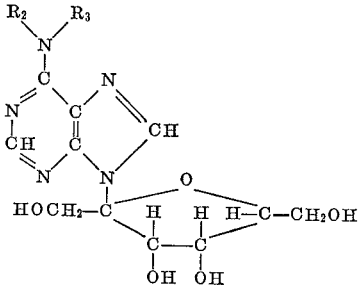

wherein $R_2$ and $R_3$ are selected from the class consisting of hydrogen, lower-alkyl, lower aralkyl, and lower-aryl, which compromises heating a compound selected from the class consisting of 6-lower-alkylmercapto-9-D-psicofuranosylpurine and 6-lower-aralkylmercapto-9-D-psiofuranosylpurine with a compound $HNR_2R_3$, wherein $R_2$ and $R_3$ have the significance hereinbefore defined, under superatmospheric pressure in the presence of an inert solvent.

27. A process for the preparation of 6-dimethylamino-9-D-psicofuranosylpurine which comprises heating a compound selected from the class consisting of 6-lower-alkylmercapto-9-D-psicofuranosylpurine and 6-lower-aralkylmercapto-9-D-psicofuranosylpurine with an aqueous dimethylamine solution under superatmospheric pressure at a temperature of the order of 150° C.

References Cited

UNITED STATES PATENTS 3,094,460   6/1963   De Boer et al. _____ 260—211.5

FOREIGN PATENTS 206,233   2/1957   Australia.

OTHER REFERENCES

Yuntsen, Jr. of Antibiotics Ser. A (Japan), November 1958, pp. 244–9.

Richter, Textbook of Organic Chemistry, 3rd edition; John Wiley and Sons, Inc., p. 729 (1952).

Yuntsen et al. Journal of Antibiotics (Japan) vol. 9 Ser. AB, pp. 195–201 (December 1956).

Fox et al, Journal of the American Chemical Society, vol. 80, No. 7, pp. 1669–1675 (Apr. 5, 1958).

LEWIS GOTTS, *Primary Examiner.*

J. R. BROWN, *Assistant Examiner.*

U.S. Cl. X.R.

195—80; 260—999

UNITED STATES PATENT OFFICE
CERTIFICATE OF CORRECTION

Patent No. 3,446,792          Dated May 27, 1969

Inventor(s) Herman Hoeksema

It is certified that error appears in the above-identified patent and that said Letters Patent are hereby corrected as shown below:

Column 2, line 2, for "$R_2$" read -- $R_3$ --; line 8, for "biphenyl" read -- biphenylyl --. Column 5, line 20, for "sued" read -- used --. Column 17, line 11, for "acylate, reacting" read -- acylate, and reacting --.

Signed and sealed this 11th day of May 1971.

(SEAL)
Attest:

EDWARD M. FLETCHER, JR.
Attesting Officer

WILLIAM E. SCHUYLER, JR.
Commissioner of Patents